(12) United States Patent  
Findlater et al.

(10) Patent No.: US 7,436,441 B2
(45) Date of Patent: Oct. 14, 2008

(54) METHOD FOR DOWN-SCALING A DIGITAL IMAGE AND A DIGITAL CAMERA FOR PROCESSING IMAGES OF DIFFERENT RESOLUTIONS

(75) Inventors: Keith Findlater, Edinburgh (GB); Robert Henderson, Edinburgh (GB); Stewart Smith, Edinburgh (GB); Jonathan Hurwitz, Edinburgh (GB); Mirko Guarnera, Gela (IT)

(73) Assignees: STMicroelectronics S.r.L., Agrate Brianza (MI) (IT); STMicroelectronics Ltd., Edinburgh (GB)

( * ) Notice: Subject to any disclaimer, the term of this patent is extended or adjusted under 35 U.S.C. 154(b) by 780 days.

(21) Appl. No.: 10/360,516

(22) Filed: Feb. 7, 2003

(65) Prior Publication Data

US 2003/0223649 A1    Dec. 4, 2003

(30) Foreign Application Priority Data

Feb. 8, 2002    (EP)    ................... 02425061

(51) Int. Cl.
*H04N 5/262* (2006.01)
(52) U.S. Cl. .................................. 348/240.2
(58) Field of Classification Search ............. 348/220.1, 348/240.99, 240.2
See application file for complete search history.

(56) References Cited

U.S. PATENT DOCUMENTS

| 5,418,565 | A | * | 5/1995 | Smith | .......................... | 348/273 |
| 5,526,048 | A | * | 6/1996 | Yamamoto | ............... | 348/223.1 |
| 5,949,483 | A |   | 9/1999 | Fossum et al. | .............. | 348/303 |
| 6,255,638 | B1 | * | 7/2001 | Eraluoto et al. | .......... | 250/208.1 |
| 6,627,896 | B1 | * | 9/2003 | Hashimoto et al. | ..... | 250/370.11 |

FOREIGN PATENT DOCUMENTS

| EP | 0632652 | 1/1995 |
| EP | 0840503 | 10/1997 |
| WO | 01/10117 | 2/2001 |

\* cited by examiner

*Primary Examiner*—David Ometz
*Assistant Examiner*—Dillon Dumford-Geszvain
(74) *Attorney, Agent, or Firm*—Lisa K. Jorgenson; Allen, Dyer, Doppelt, Milbrath & Gilchrist

(57) ABSTRACT

A digital camera for capturing and processing images of different resolutions and a corresponding method for down-scaling a digital image are provided. The method includes forming an image of a real scene on an image sensor that is made up of a plurality of pixels arranged in a matrix. The method further includes addressing and reading pixels in the matrix to obtain analog quantities related to the pixels luminance values, converting the analog quantities from the pixels matrix into digital values, and processing the digital values to obtain a data file representing the image of the real scene. To reduce computation time and power consumption, the addressing and reading of the pixels includes selecting a group of pixels from the matrix, and storing the analog quantities related to the pixels of the selected group of pixels into an analog storing circuit. The stored analog quantities are averaged to obtain an analog quantity corresponding to an average pixel luminance value.

17 Claims, 8 Drawing Sheets

(a)

(b)

(c)

(d)

(e)

(f)

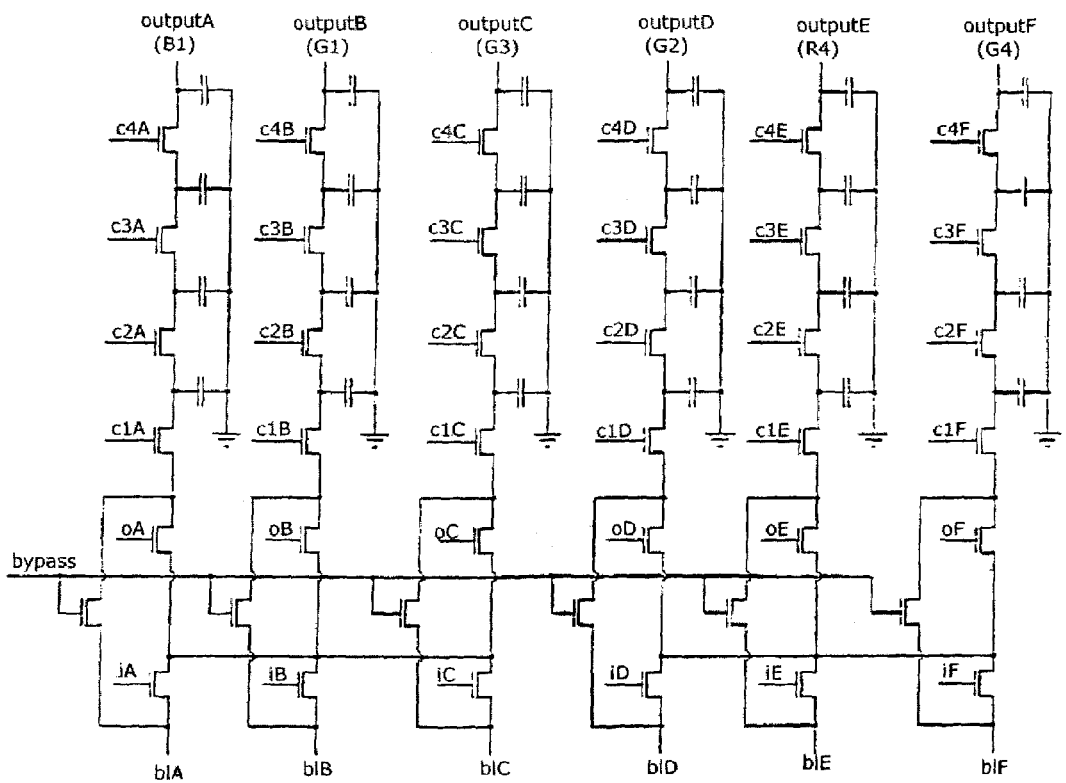

| Pixel row | Columns A-C | | | Columns D-F | | |
|---|---|---|---|---|---|---|
| - | All 'c' switches closed. All other switches open. | | | | | |
| 1 | iA+oA closed, open c4A | iC+oA closed, open c3A | iB+oB closed, open c4B | iD+oD closed, open c4D | iF+oD closed, open c3D | - |
| 2 | iA+oB closed, open c3B | iC+oB closed, open c2B | - | - | - | - |
| 3 | iA+oA closed, open c2A | iC+oA closed, open c1A | iB+oB closed, open c1B | iD+oD closed, open c2D | iF+oD closed, open c1D | - |
| 4 | iA+oC closed, open c4C | iC+oC closed, open c3C | - | iD+oE closed, open c4E | iF+oE closed, open c3E | iE+oF closed, open c4F |
| 5 | - | - | - | iD+oF closed, open c3F | iF+oF closed, open c2F | - |
| 6 | iA+oC closed, open c2C | iC+oC closed, open c1C | - | iD+oE closed, open c2E | iF+oE closed, open c1E | iE+oF closed, open c1F |
| - | All 'i' and 'o' switches open. Close all 'c' switches to average capacitor values. | | | | | |

Fig. 7

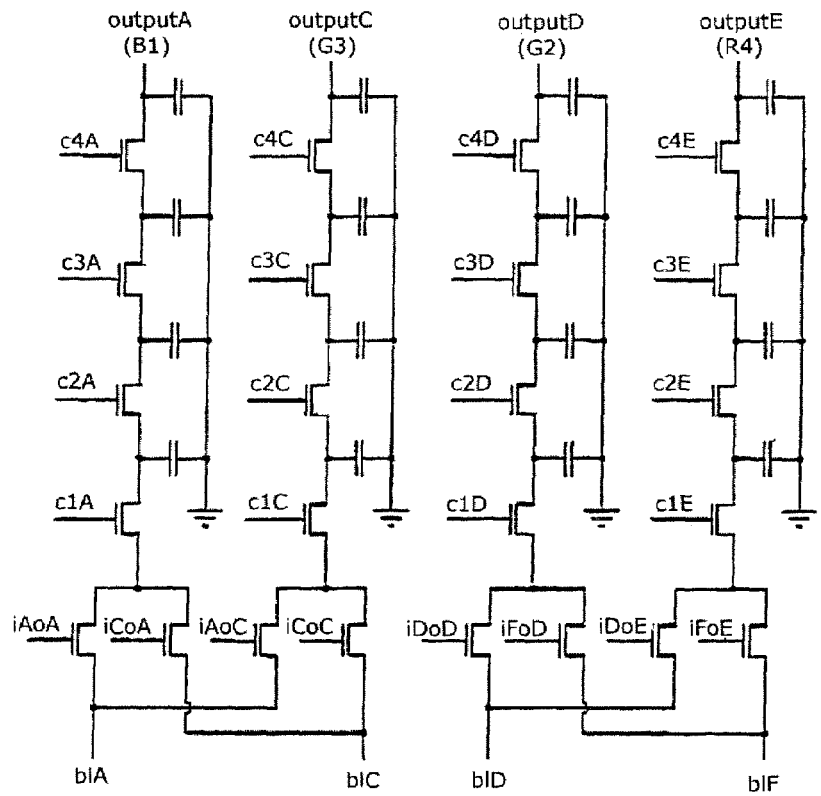

| Pixel row | Columns A-C | | Columns D-F | |
|---|---|---|---|---|
| - | All 'c' switches closed. All other switches open. | | | |
| 1 | iAoA closed, open c4A | iCoA closed, open c3A | iDoD closed, open c4D | iFoD closed, open c3D |
| 3 | iAoA closed, open c2A | iCoA closed, open c1A | iDoD closed, open c2D | iFoD closed, open c1D |
| 4 | iAoC closed, open c4C | iCoC closed, open c3C | iDoE closed, open c4E | iFoE closed, open c3E |
| 6 | iAoC closed, open c2C | iCoC closed, open c1C | iDoE closed, open c2E | iFoE closed, open c1E |
| - | All 'i' and 'o' switches open. Close all 'c' switches to average capacitor values. | | | |

Fig.9

METHOD FOR DOWN-SCALING A DIGITAL IMAGE AND A DIGITAL CAMERA FOR PROCESSING IMAGES OF DIFFERENT RESOLUTIONS

FIELD OF THE INVENTION

The present invention relates to the acquisition and processing of images in a digital format, and in particular, to a method for down-scaling a digital image and to a digital camera for capturing and processing images having different resolutions.

BACKGROUND OF THE INVENTION

Digital still cameras are currently among the most common devices used for acquiring digital images. The ever-increasing resolution of the sensors on the market and the availability of low-consumption digital-signal processors have led to the development of digital cameras which can achieve quality and resolution very similar to those offered by conventional film cameras.

As well as being able to capture individual images (still pictures), the most recent digital cameras can also acquire video sequences (motion pictures). To produce a video sequence, it is necessary to acquire a large number of photograms taken at very short intervals (for example, 15 photograms per second). The processed and compressed photograms are then encoded into the most common digital video formats (for example, MPEG-4).

In devices which can acquire both individual images and video sequences, there are two conflicting requirements. For photographic applications, high resolution and a large processing capacity are required, even at the expense of acquisition speed and memory occupation. In contrast, for video applications, a fast acquisition speed and optimization of memory resources are required, at the expense of resolution.

The same remarks are applicable to digital cameras which are not designed for acquiring video sequences in addition to still images, but are provided with a low-resolution digital display for previewing the image before shooting and/or editing an image after acquisition.

With reference to FIG. 1, a digital camera 1 for photographic and video applications includes an acquisition block 2 formed by a lens and diaphragm 3 and by a sensor 4 onto which the lens focuses an image representative of a real scene.

The sensor 4 is part of an integrated circuit comprising a matrix of photosensitive cells and a driving circuit. Each cell can be addressed and read to obtain an analog electrical quantity related to the light exposure of the cell. The analog electrical quantity obtained from each photosensitive cell is converted into a digital value by an A/D converter 5. This value may be represented by 8, 10 or 12 bits, according to the dynamics of the camera.

In a typical sensor, a single photosensitive cell is associated with each pixel. The sensor is covered by an optical filter formed by a pattern of filter elements each of which is associated with a photosensitive cell. Each filter element transmits to the photosensitive cell associated therewith the luminous radiation corresponding to the wavelength solely of red light, solely of green light, or solely of blue light (absorbing a minimal portion thereof), so that only one component, that is, the red component, the green component, or the blue component is detected for each pixel.

The type of filter used varies according to the manufacturer. The most commonly used is known as a Bayer filter. In this filter, the arrangement of the filter elements, which is known as the Bayer pattern, is shown in FIG. 4a in connection with a 6×6 pixel matrix. With a filter of this type, the green component (G) is detected by half of the pixels of the sensor with a chessboard-like arrangement. The red (R) and blue (B) components are detected by the remaining pixels in alternating rows.

The image output by the analog/digital converter 5 is an incomplete digital image because it is formed by a single component (R, G or B) per pixel. The data that represent this image are conventionally referred to as raw CFA (color filter array) data.

The raw CFA data are sent to the input of a preprocessing unit (PrePro) 6. This unit is active prior to and during the entire acquisition stage, and interacts with the acquisition block 2. The unit estimates, from the incomplete image, various parameters which are useful for performing automatic control functions, i.e., auto-focus, auto-exposure, correction of sensor defects, and white balancing functions.

The incomplete CFA digital image is then sent to a unit 7 known as the IGP (Image Generation Pipeline) which is composed of several blocks. Starting with the CFA image, a block 8 known as a ColourInterp generates by an interpolation process a complete RGB digital image in which a set of three components corresponding to the three R, G and B components is associated with each pixel. This conversion may be considered as a transition from a representation of the image in a single plane (Bayer) to a representation in three planes (R, G, B). This image is then processed by a block 9, known as ImgProc, which is provided for improving quality. Several functions are performed in this block 9, i.e., exposure correction, filtering of the noise introduced by the sensor 4, application of special effects, and other functions. The number and type varies in general from one manufacturer to another.

The complete and improved RGB image is passed to a block 10, which is known as the scaling block. This block reduces the resolution of the image, if required. An application which requires the maximum available resolution equal to that of the sensor (for example, a high-resolution photograph) does not require any reduction in resolution. If, however, for example, the resolution is to be halved for acquiring a video sequence, the scaling block 10 eliminates three quarters of the pixels.

After scaling, the RGB image is converted by a block 11 into the corresponding YCbCr image, in which each pixel is represented by a luminance component Y and by two chrominance components Cb and Cr. This is the last step performed in the IGP unit 7. The next block is a compression/encoding block 12. Generally, the JPEG format is used for individual images and the MPEG-4 format for video sequences.

The resolution necessary for video applications or for preview display is lower than that required for photographic applications. Nevertheless, in the prior art apparatus, the sensor and the IGP are at maximum resolution in both cases. This leads to wasted computation, which translates into a large consumption of time and energy and an unnecessary occupation of memory.

SUMMARY OF THE INVENTION

In view of the foregoing background, an object of the present invention is to provide a method for down-scaling a digital image.

Another object of the present invention is to provide a digital camera for capturing and processing images having different resolutions.

This and other objects, advantages and features in accordance with the present invention are provided by a method for down-scaling a digital image comprising forming an image of a real scene on an image sensor comprising a plurality of pixels arranged in a matrix, and addressing and reading the pixels in the matrix to obtain analog quantities on luminance values of the pixels.

The addressing and reading preferably comprises selecting a group of pixels in the matrix, storing the analog quantities of the selected group of pixels, and producing a weighted average of the stored analog quantities to obtain an analog quantity corresponding to an average pixel luminance value. The method preferably further comprises converting the analog quantities on the average pixel luminance values of the selected groups of pixels to digital values, and processing the digital values to obtain a data file representing the image of the real scene.

The digital camera preferably comprises an image sensor comprising a plurality of pixels arranged in a matrix, and a driver for addressing and reading the pixels in the matrix to obtain analog quantities on luminance values of the pixels. An analog/digital circuit preferably converts the analog quantities on the luminance values to digital values.

The digital camera preferably comprises a processing circuit for processing the digital values to obtain a data file representing an image. The processing circuit may comprise an analog down-scaling unit and a by-pass circuit connected thereto for by-passing or enabling the analog down-scaling unit for respectively obtaining a high resolution image or a low resolution image.

The analog down-scaling unit and the by-pass circuit are preferably connected between the image sensor and the analog/digital circuit. The analog down-scaling unit preferably comprises at least one bank of capacitors, and first and second sets of switches. The first set of switches is for selecting groups of pixels from the matrix, and for charging the at least one bank of capacitors to respective levels corresponding to the analog quantities of the selected group of pixels. The second set of switches produces a weighted average of the respective charge levels of the at least one bank of capacitors to obtain for each selected group of pixels an analog quantity corresponding to an average pixel luminance value.

BRIEF DESCRIPTION OF THE DRAWINGS

The invention will be better understood from the following detailed description of various embodiments thereof given with reference to the appended drawings, in which:

FIG. 7 shows a circuit diagram for down-scaling a 6×6 pixel matrix in a digital camera and a table illustrating operation of the circuit according to the invention;

FIG. 9 shows a simplified version of the circuit diagram illustrated in FIG. 7 and a corresponding operation table according to the invention.

DETAILED DESCRIPTION OF THE PREFERRED EMBODIMENTS

Figure 1:
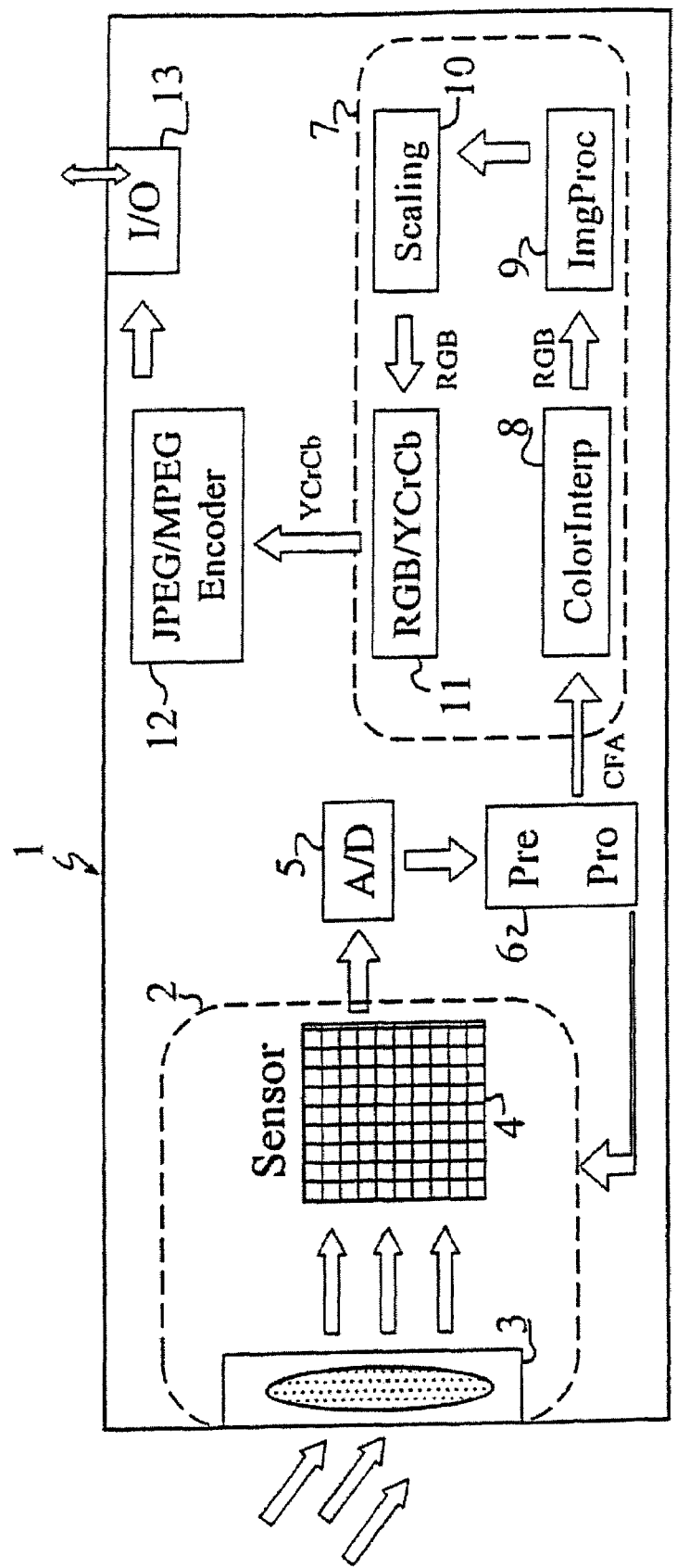
FIG. 1 is a block diagram of a digital camera according to the prior art.
Figure 2:
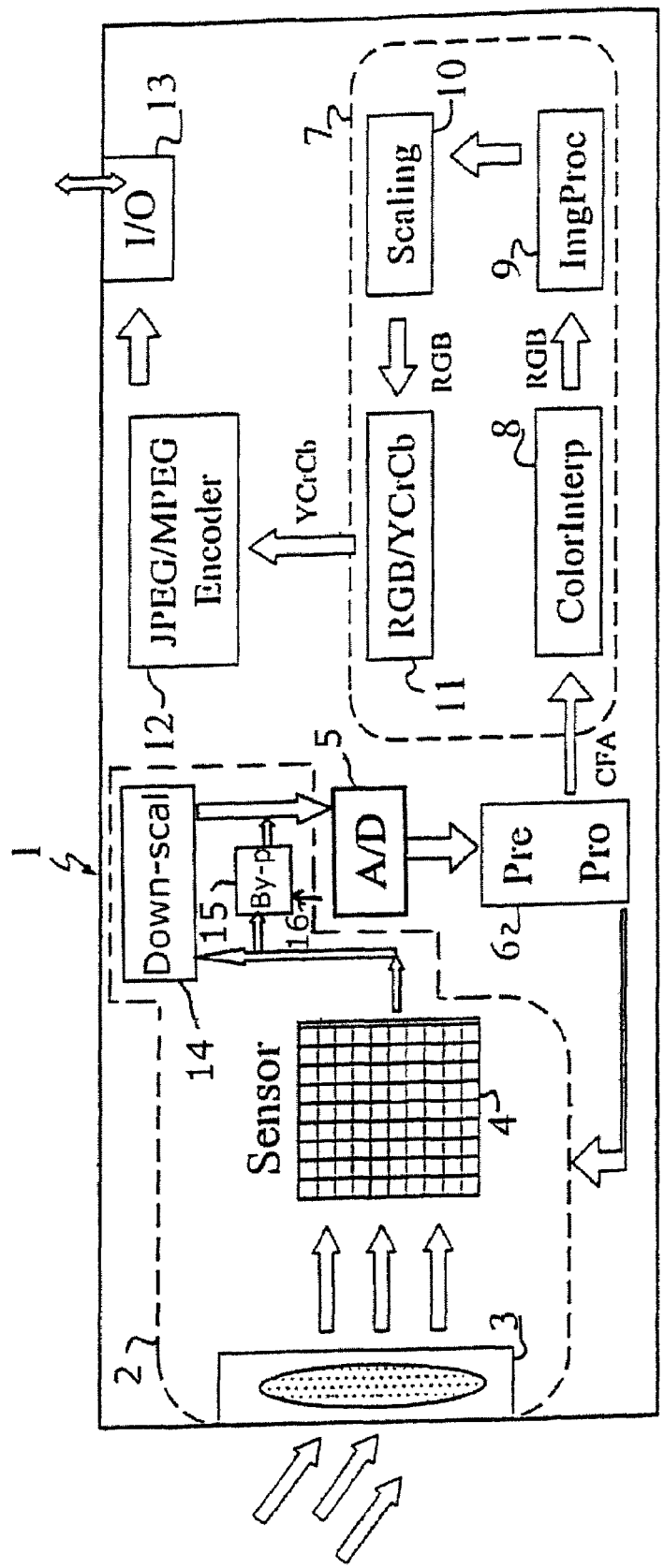
FIG. 2 is a block diagram of a digital camera according to the invention.

The block diagram of FIG. 2 is similar to that of FIG. 1, and reference numerals identical to the reference numerals in FIG. 1 are used to identify the same or equivalent blocks. A substantial difference in FIG. 2 is that the sensor output is not connected to the A/D block 5 directly, but is connected to the A/D block 5 through an analog down-scaling unit 14. In addition, a block 15 is provided to by-pass the down-scaling unit 14 if a by-pass signal is applied to a control input 16. A digital scaling block 10, as shown in FIG. 1, is also included in FIG. 2. However, it can be omitted if a further down-scaling is not required.

Figure 3:
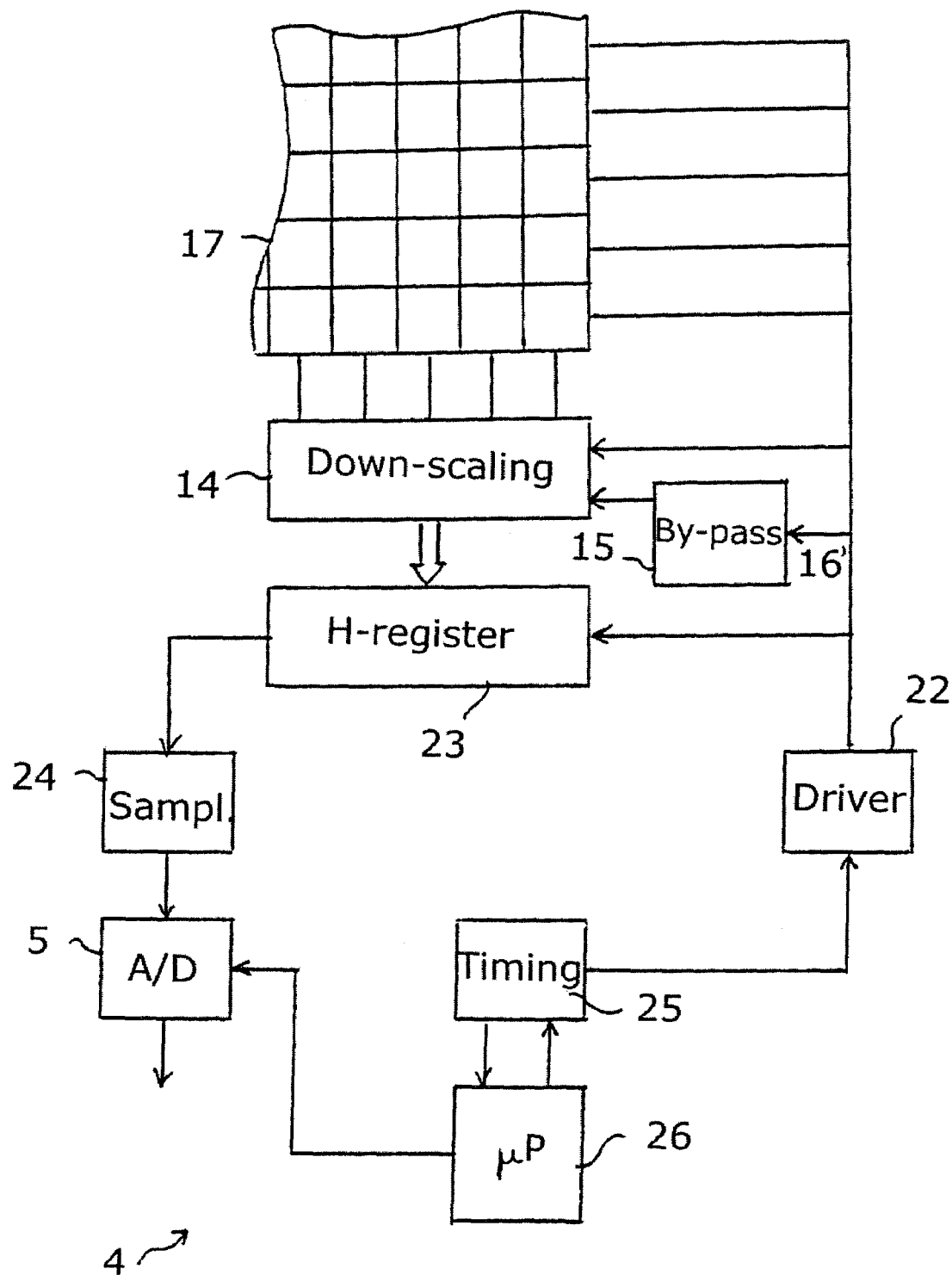
FIG. 3 is a detailed block diagram of a portion of the digital camera illustrated in FIG. 1.

In FIG. 3 the sensor 4 is shown in greater detail, together with the analog down-scaling unit 14 and the by-pass block 15. A driver 22 generates clocking signals for addressing each pixel of a sensor matrix 17 at the intersections of row and column lines, and transferring pixel signals to a register 23 through the analog down-scaling unit 14. The analog signal output by the register 23 is sampled in a sampling block 24 and converted into digital form in the A/D block 5 for further digital processing, as explained in FIG. 1. A timing generator 25 provides timing signals to a plurality of system units, and in particular, to a driver 22. A microprocessor controller 26 controls the A/D converter 5 and additional system units (not shown), and exchanges control signals with the timing generator 25.

Figure 4:
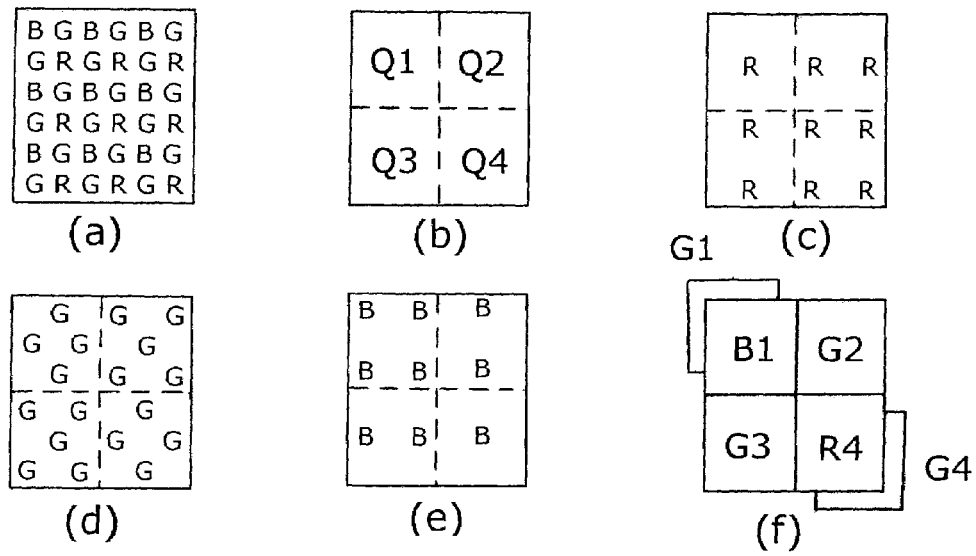
FIGS. 4a-4f show how the resolution of a digital image is modified by the down-scaling method according to the invention.

A broad explanation of the operation of the down-scaling method of the invention is given below with reference to FIGS. 4a-4f. FIG. 4a shows a 6×6 pixel matrix of a Bayer patterned pixel array. FIG. 4b shows four 3×3 pixel sub-matrices which divide the 6×6 pixel matrix into four quarters Q1-Q4. FIGS. 4c-4e show the arrangements of the red (R), green (G) and blue (B) pixels in the matrix of FIG. 4a.

According to the down-scaling method of the invention, the four red pixels R in quarter Q4 are detected. An analog average of the luminance levels of these four pixels is obtained and a new red pixel having this average as its luminance value, as shown at R4 in FIG. 4f, is defined. In the same way, the four blue pixels in quarter Q1 are detected and averaged to a new blue pixel B1. The four green pixels at the corners of quarter Q2 and the four green pixels at the corners of quarter Q3 are also detected. An average of each group of four pixels is obtained and two new average green pixels, as shown with G2 and G3 in FIG. 4f, are defined. As an alternative or in addition, the four green pixels in quarter Q1 and the four green pixels in quarter Q4 can be used to obtain two new average green pixels, as shown with G1 and G4 in FIG. 4f.

Figure 5:
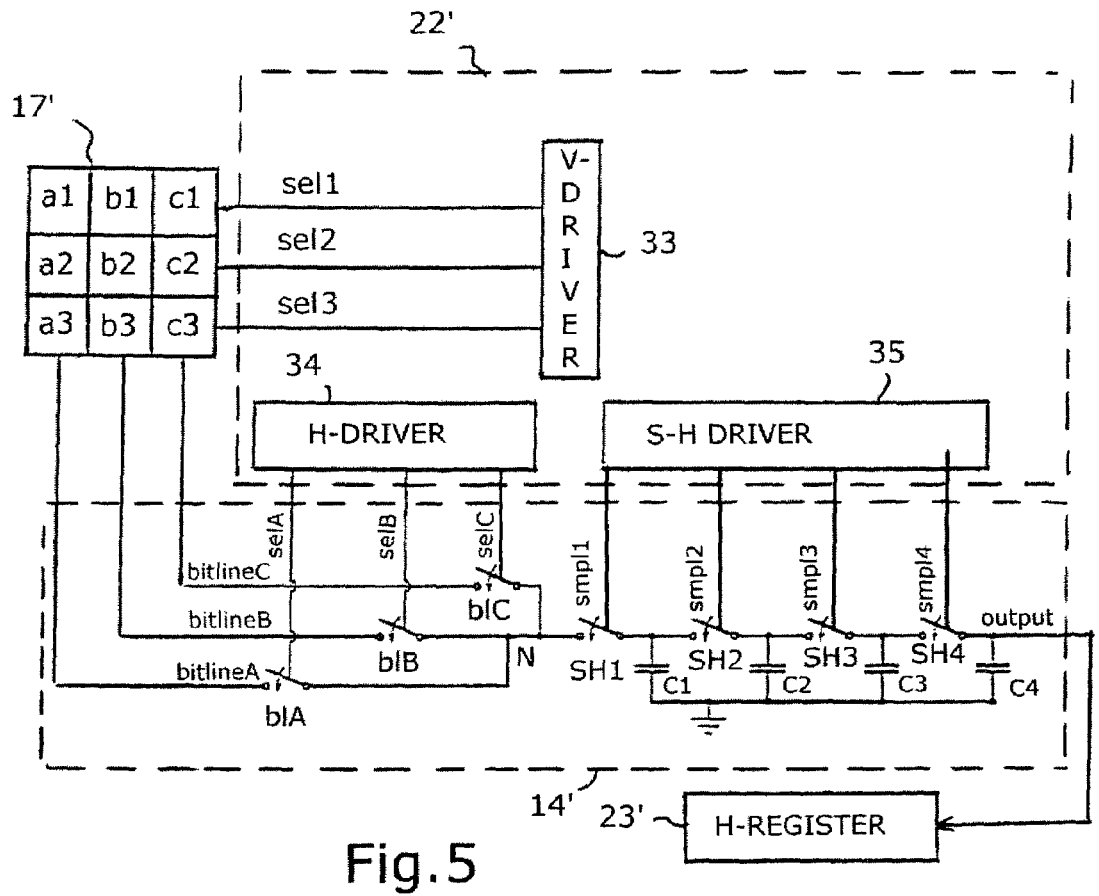
FIG. 5 is a basic circuit diagram for implementing the down-scaling method according to the invention.

FIG. 5 shows a preferred implementation of the analog averaging of four pixels. A 3×3 pixel sub-matrix 17' has three column lines, indicated as bitlineA, bitlineB and bitlineC, connected to a horizontal register 23' through an averaging unit 14'. A driver unit 22' includes a vertical driver 33 that selects and activates the matrix lines of the matrix 17' by control signals se11, se12 and se13, a horizontal driver 34 that generates control signals se1A, se1B and se1C, and a sample and hold driver 35 that generates control signals smp11, smp12, smp13 and smp14. The averaging unit 14' comprises four capacitors C1, C2, C3 and C4 having an equal capacitance. The four capacitors have a common terminal and are connectable in parallel to one another by three sample and hold switches SH2, SH3 and SH4 respectively controlled by signals smp12, smp13 and smp14. A fourth sample and hold switch SH1 is controlled by signal smp11 and is connected to a common terminal N of three switches b1A, b1B and b1C which are respectively connected to bitline A, bitline B and bitline C.

In operation, the drivers 33, 34, 35 generate control signals to activate the matrix rows in sequence and to close and/or open the switches according to a predetermined timing. More particularly, starting from an initial condition with switches b1A, b1B and b1C open and switches SH1, SH2, SH3 and SH4 closed, the timing of the control signals for averaging four pixels of the matrix 17', for example, the corner pixels a1, c1, a3, c3, is as follows:

1) se11 is high to activate the row line 1, se12 and se13 are low; se1A is high to close switch b1A; and se1B and se1C are low; the value of pixel a1 is charged into capacitors C1-C4, then smp14 goes low to open switch SH4;

2) with switch SH4 hold open—se11 is high to activate the row line 1 and se12 and se13 are low; se1C is high to close switch b1C and se1A and se1B are low; the value of pixel c1 is charged into capacitors C1-C3, then smp13 goes low to open switch SH3;

3) with switches SH4 and SH3 hold open—se13 is high to activate the row line 3, se11 and se12 are low; se1A is high to close switch b1A and se1B and se1C are low; the value of pixel a3 is charged into capacitors C1 and C2, then smp12 goes low to open switch SH2;

4) with switches SH4, SH3 and SH2 hold open—se13 is high to activate the row line 3 and se11 and se12 are low; se1C is high to close switch b1C and se1A and se1B are low; the value of pixel C3 is charged into capacitor C1, then smpli goes low to open switch SH1;

5) now the pixel values of a1, c1, a3, c3 are respectively on capacitors C4, C3, C2, C1—to perform the averaging, smp12, smp13 and smp14 are set high to turn on the associated switches SH2, SH3 and SH4, thus redistributing the charge between the four capacitors in parallel; the output voltage representing the average luminance level of the four pixels is provided to the horizontal register 23'.

As readily understood by one skilled in the art of electronic circuit design, the averaging unit can be implemented in many different ways. In particular, alternative ways of connecting the capacitors to the output of the bitline switching arrangement can be devised to avoid the series connection of the access switches (the sample and hold switches in FIG. 5). Furthermore, the capacitors do not need to be equal. Unequal capacitors can be used advantageously when weighted averaging is required. Moreover, a different number of capacitors can be used according to the number of pixel values to be averaged.

Figure 6:
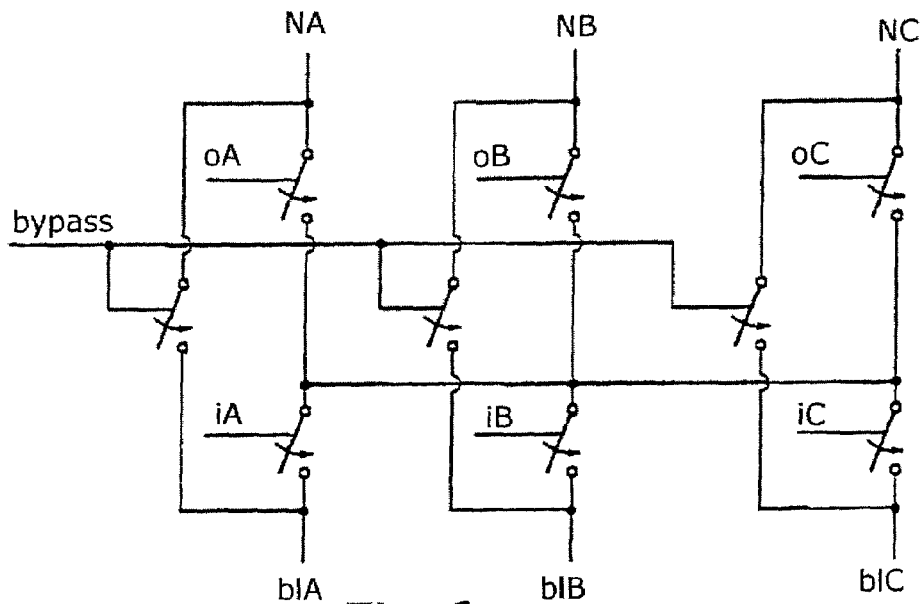
FIG. 6 is a circuit diagram illustrating the down-scaling method according to the invention.

To perform the down-scaling operation on a 6×6 pixel matrix, a more complex circuit is required. Consider first FIG. 6 wherein b1A, b1B and b1C are three column lines of a pixel matrix and NA, NB, NC are three output nodes to be connected each to a bank of four capacitors, as C1-C4 in FIG. 5. Each column line b1A, b1B, b1C can be connected to an output node NA, NB, NC either through switches driven by respective signals indicated oA, iA, oB, iB, oC, iC, or through bypass switches driven in common by a signal indicated bypass. The switches can be driven by a suitable control unit to pass a pixel value from any of the three matrix columns to any of the three capacitor banks connected to the output nodes. For example, to pass a pixel value from column b1C to the capacitor bank connected to output node NA, the switches oA and iC are closed, while the remaining switches remain open. The control unit drives the switches so that only one pixel bitline value may be routed to an output node at a time, except when a bypass signal closes the bypass switches. In this case, all other switches are open and the pixels are read as in a normal reading of the pixel matrix at full resolution.

Consider now a sensor comprising a 6×6 pixel matrix like the Bayer patterned matrix shown in FIG. 4a, with columns indicated as A, B, C, D, E, F and rows indicated 1, 2, 3, 4, 5, 6. In the sensor all the pixels in a row share a read access line and all the pixels in a column are connected to a common line (bitline). A circuit for down-scaling the 6×6 Bayer patterned matrix to a 2×2 Bayer patterned matrix with two extra averaged pixels values (like the averaged green pixels in quarters Q1 and Q4 as shown in FIG. 4f) is shown in FIG. 7. The switches shown in the previous Figures have been replaced by NMOS transistors. The column lines, or bitlines, are indicated as b1A-b1F, the output lines, i.e., the output terminals of the six capacitor banks, are indicated as outputA-outputF. The signals for driving the transistors of the capacitor banks are identified by c1-c4 followed by a letter A-F, as in the corresponding output line. A switching arrangement similar to the switching arrangement of FIG. 6 but using NMOS transistors in place of switches is connected between the column lines b1A-b1F and the capacitor banks. The gates of the bypass transistors of the arrangement are connected to a common line for receiving a bypass signal. The control signals applied to the gates of the switching transistors are identified by the letters "o" and "i" followed by a letter A-F, as in the corresponding column line b1A-b1F.

Figure 8:
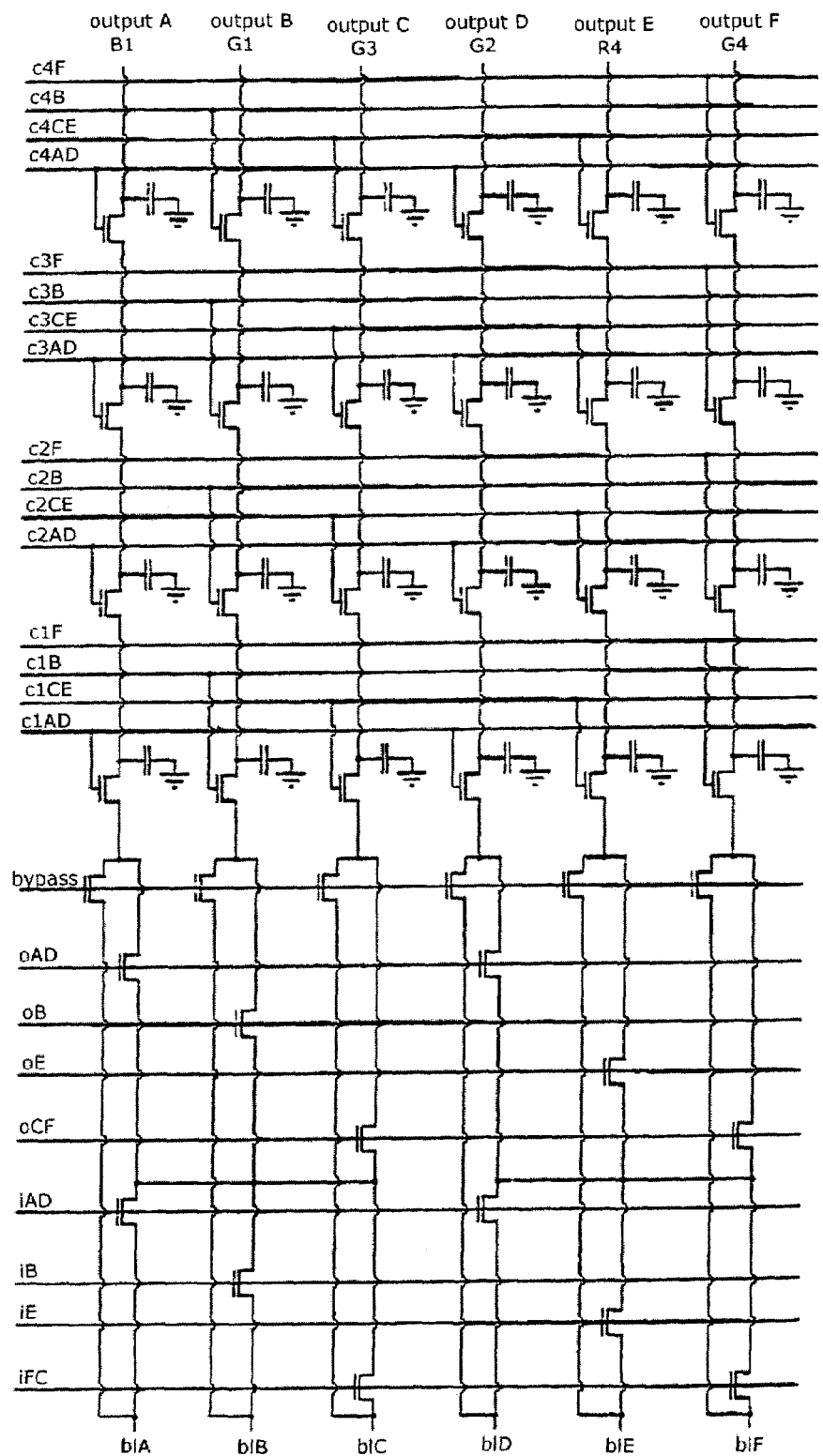
FIG. 8 is a circuit diagram similar to the circuit diagram illustrated in FIG. 7, but with a simplified wiring according to the invention.

The sequence of switching operations used to perform the down-scaling as explained above in FIG. 4 is given in a table that is included in FIG. 7. Some sharing between the control signals is possible so that the wiring required can be reduced, as shown in FIG. 8. The pairs of control signals oA and oD, oC and oF, iA and iD, iC and iF are respectively replaced by single control signals oAD, oCF, iAD, iCF.

If the extra two green values (G1 and G4) are not necessary, the circuit can be simplified as shown in FIG. 9. The switching sequence is given in the table included in FIG. 9.

Figure 10:
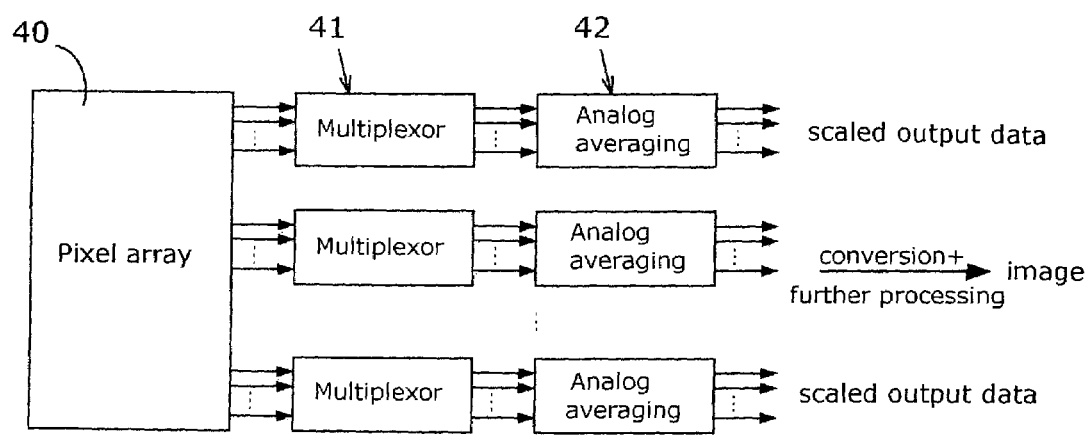
FIG. 10 is a block diagram representing a generalized down-scaling system of a digital camera according to the invention.

The examples described above use a down-scaling by a factor 3, however, the invention can be implemented also for down-scaling by factors other than 3. In general, a down-scaling unit operating according to the method of the invention can be represented by a block diagram as shown in FIG. 10. The output lines of a pixel matrix 40 are connected to a plurality of multiplexors 41, which have the same function as the switching arrangements connected to the matrix output lines in FIG. 6, for example, and the multiplexor outputs are connected to respective analog averaging blocks 42 which have the same function as the capacitor banks. The scaled output data from the analog averaging blocks 42 are then converted in digital form, and further processed as explained in FIG. 2.

As readily understood from the above description, the object of the invention is fully achieved. In particular, the computation time and the power consumption are greatly reduced because the A/D converter rate is reduced (by ⅙ in the example shown and described), and the amount of pixel data to be processed by the IGP to produce the final image is also reduced (by ⅙ in the example). As a further advantage, the output of the down-scaling unit applied to a Bayer patterned image sensor is itself a Bayer pattern. Therefore, both the high and the low resolution outputs can be processed by the same IGP unit. Moreover, the overall system complexity is reduced because the digital scaling circuit can be omitted.

Although only a few embodiments of the invention have been described, a number of modifications are possible within the scope of the same inventive concept. For example, the inventive method can be applied advantageously to a system comprising a sensor with a filter of a type different from the Bayer filter, or also to a monochromatic sensor.

That which is claimed is:

1. A method for down-scaling a digital image in a digital camera, the method comprising:
    forming an image of a real scene on an image sensor comprising a plurality of pixels arranged in a matrix, with a stationary matrix pattern of color filters being adjacent the image sensor and having a geometrical arrangement;
    addressing and reading the pixels in the matrix to obtain analog quantities on luminance values of the pixels, the addressing and reading comprising
        selecting a group of pixels in the matrix having a same color from the stationary matrix pattern of color filters having the geometrical arrangement,
        storing the analog quantities of the selected group of pixels having the same color, and
        producing a weighted average of the stored analog quantities for each group of pixels having the same color to obtain an analog quantity corresponding to an average pixel luminance value;
    converting the analog quantities on the average pixel luminance values of the selected group of pixels having the same color to digital values; and
    processing the digital values to obtain a data file representing the image of the real scene.

2. A method according to claim 1, wherein producing a weighted average is carried out using equal weights.

3. A method according to claim 1, wherein the digital camera comprises a driver for addressing and reading the pixels in the matrix, and an analog/digital circuit for converting the analog quantities to digital values.

4. A method according to claim 3, wherein the digital camera further comprises a processing circuit for processing the analog values to obtain the data file, the processing circuit comprising an analog down-scaling unit and a by-pass circuit connected thereto for by-passing or enabling the analog down-scaling unit for respectively obtaining a high resolution image or a low resolution image.

5. A method according to claim 4, wherein the analog down-scaling unit and the by-pass circuit are connected between the image sensor and the analog/digital circuit.

6. A method according to claim 4, wherein the analog down-scaling unit comprises at least one bank of capacitors, the method further comprising:
    charging the at least one bank of capacitors to respective levels corresponding to the analog quantities of the selected group of pixels; and
    producing a weighted average of the respective charge levels of the at least one bank of capacitors to obtain for each selected group of pixels the analog quantity corresponding to the average pixel luminance value.

7. A method according to claim 6, wherein the at least one bank of capacitors comprises a plurality of capacitors having equal values.

8. A method according to claim 6, wherein each group of pixels includes four pixels in a 3×3 sub-matrix, and the at least one bank of capacitors comprises four capacitors.

9. A method according to claim 8, further comprising:
    selectively connecting a selected column line to the four capacitors; and
    selectively isolating each of the four capacitors.

10. A digital camera for capturing and processing images having different resolutions, the digital camera comprising:
    an image sensor comprising a plurality of pixels arranged in a matrix;
    a stationary matrix pattern of color filters adjacent said image sensor, said stationary matrix pattern of color filters having a geometrical arrangement;
    a driver for addressing and reading the pixels in the matrix to obtain analog quantities on luminance values of the pixels;
    an analog/digital circuit for converting the analog quantities on the luminance values to digital values; and
    a processor for processing the digital values to obtain a data file representing an image, said processor comprising an analog down-scaling unit and a by-pass circuit connected thereto for by-passing or enabling said analog down-scaling unit for respectively obtaining a high resolution image or a low resolution image, said analog down-scaling unit and said by-pass circuit connected between said image sensor and said analog/digital circuit, and said analog down-scaling unit comprising
        at least one bank of capacitors,
        a first set of switches for selecting groups of pixels having a same color from the matrix and for charging said at least one bank of capacitors to respective levels corresponding to the analog quantities of the selected group of pixels having the same color, and
        a second set of switches for producing a weighted average of the respective charge levels of said at least one bank of capacitors to obtain for each selected group of pixels having the same color an analog quantity corresponding to an average pixel luminance value.

11. A digital camera according to claim 10, wherein said at least one bank of capacitors comprises a plurality of capacitors having equal values; and wherein the weighted average is based upon using equal weights.

12. A digital camera according to claim 10, wherein each group of pixels includes four pixels in a 3×3 sub-matrix, and said at least one bank of capacitors comprises four capacitors.

13. A digital camera according to claim 12, wherein said second set of switches comprises:
    row and column line switches;
    at least one column switch for selectively connecting a selected column line to said four capacitors; and
    at least one isolation switch for selectively isolating each of said four capacitors.

14. A digital camera comprising:
    an image sensor comprising a plurality of pixels arranged in a matrix;
    a stationary matrix pattern of color filters adjacent said image sensor, said stationary matrix pattern of color filters having a predetermined geometrical arrangement;
    a driver for addressing and reading the pixels in the matrix to obtain analog quantities on luminance values of the pixels;
    an analog/digital circuit for converting the analog quantities on the luminance values to digital values; and
    a processing circuit for processing the digital values to obtain a data file representing an image, said processing circuit comprising an analog down-scaling unit and a by-pass circuit connected thereto for by-passing or enabling said analog down-scaling unit for respectively obtaining a high resolution image or a low resolution image, said analog down-scaling unit and said bypass circuit connected between said image sensor and said analog/digital circuit, and said analog down-scaling unit comprising at least one bank of capacitors, a first set of switches for selecting groups of pixels having a same color from the matrix and for charging said at least one bank of capacitors to respective levels corresponding to the analog quantities of the selected group of pixels having the same color, and a second set of switches for producing a weighted average of the respective charge levels of said at least one bank of capacitors to obtain for each selected group of pixels having the same color an analog quantity corresponding to an average pixel luminance value.

15. A digital camera according to claim 14, wherein said at least one bank of capacitors comprises a plurality of capacitors having equal values; and wherein the weighted average is based upon using equal weights.

16. A digital camera according to claim 14, wherein each group of pixels includes four pixels in a 3×3 sub-matrix, and said at least one bank of capacitors comprises four capacitors.

17. A digital camera according to claim 16, wherein said second set of switches comprises row and column line switches for selectively connecting a selected column line to said four capacitors, and for selectively isolating each of said four capacitors.

* * * * *